United States Patent
Abe et al.

(10) Patent No.: US 10,277,799 B2
(45) Date of Patent: Apr. 30, 2019

(54) IMAGE CAPTURING APPARATUS, AND CONTROL METHOD AND STORAGE MEDIUM THEREOF

(71) Applicant: CANON KABUSHIKI KAISHA, Tokyo (JP)

(72) Inventors: Hiroshi Abe, Ichikawa (JP); Takuya Izumi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/614,753

(22) Filed: Jun. 6, 2017

(65) Prior Publication Data

US 2017/0359501 A1 Dec. 14, 2017

(30) Foreign Application Priority Data

Jun. 10, 2016 (JP) .................. 2016-116455

(51) Int. Cl.
*H04N 5/232* (2006.01)

(52) U.S. Cl.
CPC ..... *H04N 5/23212* (2013.01); *H04N 5/23216* (2013.01); *H04N 5/232122* (2018.08); *H04N 5/232933* (2018.08)

(58) Field of Classification Search
CPC .......... H04N 5/23212; H04N 5/23216; H04N 5/232122
See application file for complete search history.

(56) References Cited

U.S. PATENT DOCUMENTS

| | | | |
|---|---|---|---|
| 2012/0242890 A1* | 9/2012 | Nakamoto | H04N 5/23212 348/346 |
| 2015/0116578 A1* | 4/2015 | Hamada | H04N 5/23209 348/349 |
| 2016/0080631 A1* | 3/2016 | Huh | H04N 5/23212 348/349 |
| 2016/0150166 A1* | 5/2016 | Hashimoto | H04N 5/23212 348/241 |
| 2016/0173758 A1* | 6/2016 | Kai | H04N 5/23212 348/345 |
| 2017/0366740 A1* | 12/2017 | Nakamaru | H04N 5/23212 |
| 2018/0149826 A1* | 5/2018 | Lei | G02B 7/028 |

FOREIGN PATENT DOCUMENTS

JP 2005-227639 A 8/2005

* cited by examiner

*Primary Examiner* — Daniel M Pasiewicz
(74) *Attorney, Agent, or Firm* — Cowan, Liebowitz & Latman, P.C.

(57) ABSTRACT

An image capturing apparatus includes: an image sensor configured to capture an object image; a first focus detection unit configured to perform focus detection based on a pair of image signals generated by the image sensor; a second focus detection unit configured to image the object image on a focus detection element as a pair of images, and perform focus detection based on a pair of image signals; a setting unit configured to set an AF correction value used in correction of a focus detection result by the second focus detection unit; and a determining unit configured to determine accuracy of the AF correction value, based on a difference between a focus detection result by the first focus detection unit and a focus detection result by the second focus detection unit.

18 Claims, 11 Drawing Sheets

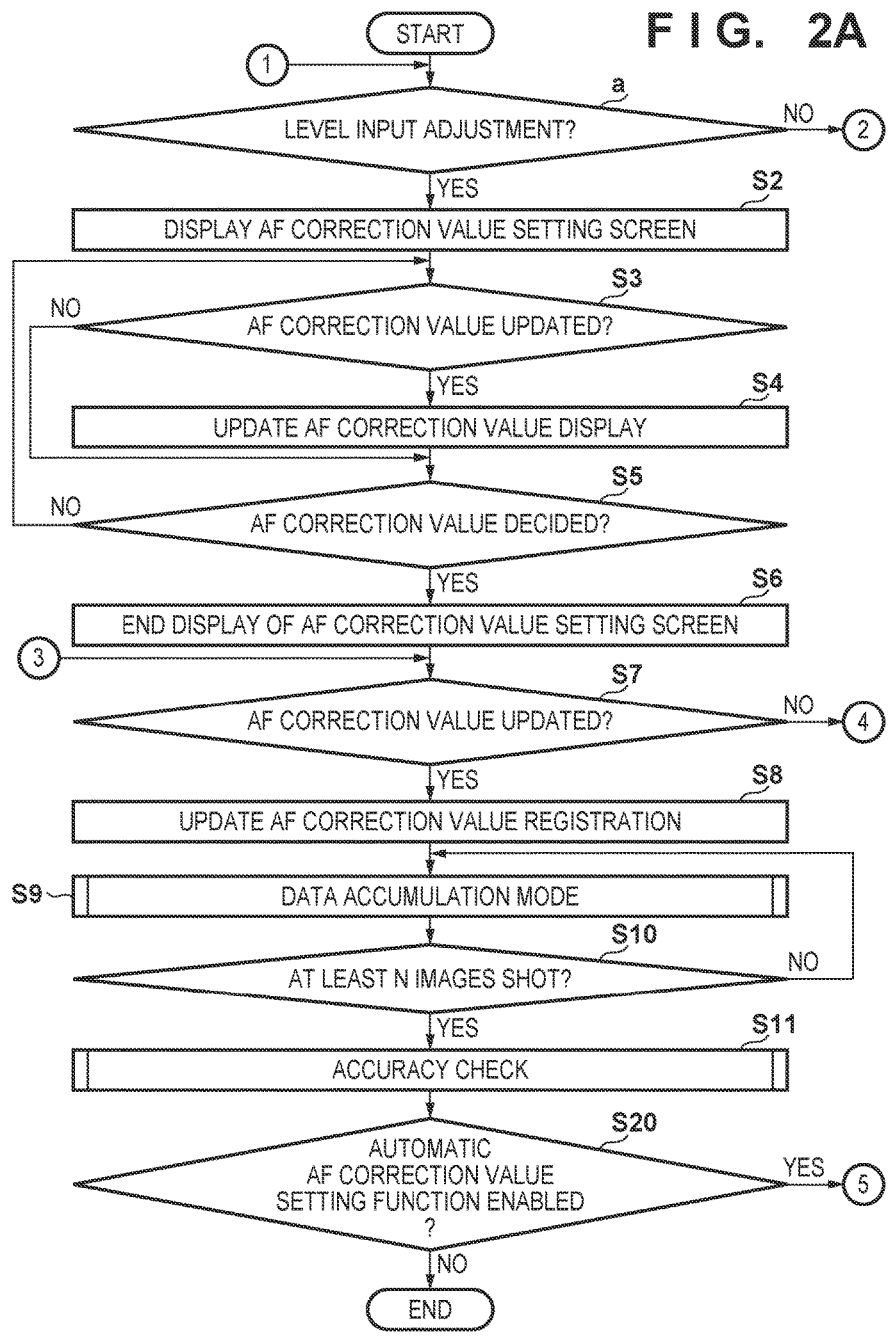

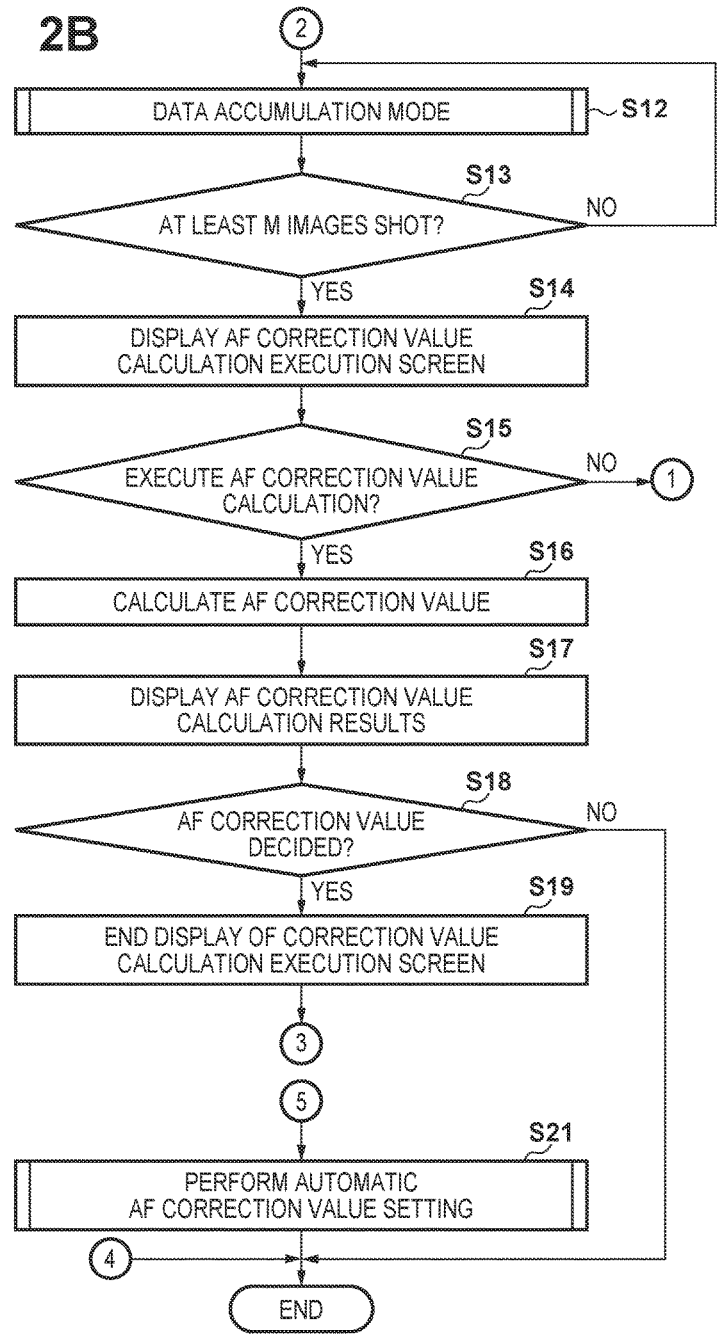

FIG. 4

| Data No. | FOCUS DETECTION RESULTS IN CAPTURING PLANE PHASE DIFFERENCE AF | FOCUS DETECTION RESULTS IN SECOND IMAGING PHASE DIFFERENCE AF | TEMPERATURE | CR VALUE | TIME |
|---|---|---|---|---|---|
| 1 | 0.035mm | 0.003mm | 23.2°C | 100 | 14:25 |
| 2 | 0.042mm | -0.005mm | 23.4°C | 105 | 14:26 |
| 3 | 0.031mm | 0.002mm | 23.0°C | 98 | 14:26 |
| 4 | 0.052mm | 0.010mm | 23.0°C | 103 | 14:28 |
| 5 | -0.014mm | -0.006mm | 18.3°C | 72 | 20:26 |
| 6 | -0.021mm | -0.001mm | 18.1°C | 68 | 20:30 |
| ... | ... | ... | ... | ... | ... |

AF CORRECTION VALUE REGISTRATION UPDATED (at row 5, 20:26)

IMAGE CAPTURING APPARATUS, AND CONTROL METHOD AND STORAGE MEDIUM THEREOF

BACKGROUND OF THE INVENTION

Field of the Invention

The present invention relates to a technique of correcting a focus detection error in an image capturing apparatus.

Description of the Related Art

A lens-interchangeable single lens reflex camera is often equipped with a focus detection system employing a phase difference detection scheme, in which a focus state (defocus amount) of an imaging optical system is detected from a phase difference of a pair of image signals formed by light passing through the imaging optical system in the interchangeable lens. In such a phase difference detection scheme, there are cases where an in-focus position cannot be accurately detected due to the influence of the environment at the time of shooting, or due to the influence of manufacturing errors of the single lens reflex camera and the interchangeable lens. In order to solve such a problem, Japanese Patent Laid-Open No. 2005-227639 discloses an image capturing apparatus having a function (an AF micro-adjustment function) that enables a user to arbitrarily perform micro-adjustment of an adjustment value of an automatic focus adjustment function (AF) function.

However, with the AF micro-adjustment function, there is a problem that it is necessary to repeat shooting and confirmation work in order to confirm whether or not the result of micro-adjustment by the user is correct. Also, there are cases where, even if micro-adjustment of focus has been performed once using the AF micro-adjustment function, the necessary adjustment value changes due to a change in the environment.

SUMMARY OF THE INVENTION

The present invention was made in consideration of the problems described above, and prevents a reduction in focus detection accuracy due to a user continuing to use an AF correction value having a large error.

According to a first aspect of the present invention, there is provided an image capturing apparatus, comprising: an image sensor configured to capture an object image that was formed by an imaging lens; a first focus detection unit configured to perform focus detection based on a pair of image signals generated by the image sensor; a second focus detection unit configured to image the object image on a focus detection element as a pair of images by a second imaging optical system, and perform focus detection based on a pair of image signals generated by the focus detection element; a setting unit configured to set an AF correction value used in correction of a focus detection result by the second focus detection unit; and a determining unit configured to determine accuracy of the AF correction value that was set by the setting unit, based on a difference between a focus detection result by the first focus detection unit and a focus detection result by the second focus detection unit.

According to a second aspect of the present invention, there is provided a control method of an image capturing apparatus having an image sensor configured to capture an object image that was formed by an imaging lens, the method comprising: first focus detection of performing focus detection based on a pair of image signals generated by the image sensor; second focus detection of imaging the object image on a focus detection element as a pair of images by a second imaging optical system, and performing focus detection based on a pair of image signals generated by the focus detection element; setting an AF correction value used in correction of a focus detection result in the second focus detection; and determining accuracy of the AF correction value that was set in the setting, based on a difference between a focus detection result in the first focus detection and a focus detection result in the second focus detection.

Further features of the present invention will become apparent from the following description of exemplary embodiments with reference to the attached drawings.

BRIEF DESCRIPTION OF THE DRAWINGS

FIGS. 2A and 2B are flowcharts showing processing from setting an AF correction value to performing an accuracy check in one embodiment of the present invention.

FIG. 4 shows a database accumulated in one embodiment of the present invention.

DESCRIPTION OF THE EMBODIMENTS

Following is a detailed description of an embodiment of the present invention with reference to the accompanying drawings. However, the dimensions, shapes, relative positions, and the like of the constituent components disclosed by way of example in the present embodiment should be appropriately changed according to the configuration of the apparatus in which the present invention is applied, or according to various conditions, and the present invention is not limited to the examples disclosed here.

Figure 1:
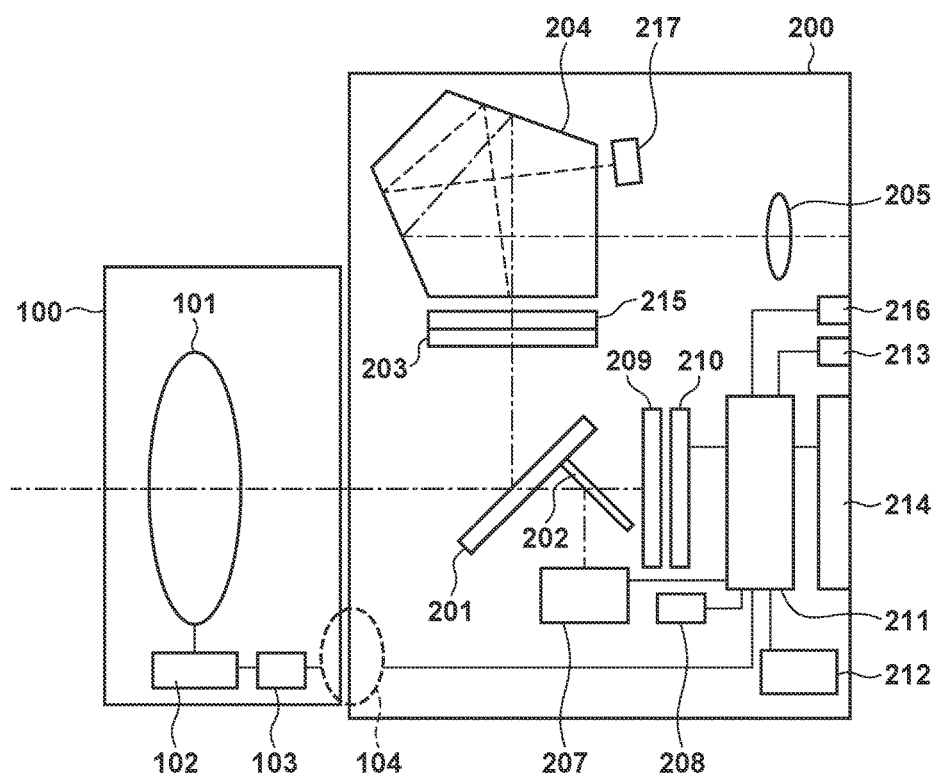
FIG. 1 is a block diagram showing a schematic configuration of an image capturing apparatus in one embodiment of the present invention.

FIG. 1 is a block diagram showing a schematic configuration of an image capturing apparatus according to one embodiment of the present invention. In FIG. 1, in an image capturing apparatus 200, an imaging lens 100 is detachably attached through a lens mounting mechanism of an unshown mount portion. An electrical contact unit 104 is provided in the mount portion. The image capturing apparatus 200 communicates with the imaging lens 100 through the electrical contact unit 104 to control a focus lens 101 in the imaging lens 100. Note that in FIG. 1, only the focus lens 101 is shown as a lens in the imaging lens 100, but commonly, other than the focus lens 101, a plurality of lenses such as a variable magnification lens and a fixed lens are also provided in the imaging lens 100.

Luminous flux from an object is guided through the imaging optical system (including the focus lens 101) in the imaging lens 100 to a main mirror 201 in the image capturing apparatus 200. The main mirror 201 is disposed obliquely to an optical axis in a shooting optical path, and can be moved between a first position (the position shown in the drawing) where the main mirror 201 guides the luminous flux from the object to an upper finder optical system, and a second position where the main mirror 201 is withdrawn outside of the shooting optical path. Also, a center portion of the main mirror 201 is a half mirror, and when the main mirror 201 is set so the mirror is down in the first position, some of the luminous flux from the object passes through the half mirror portion. This luminous flux that passed through the half mirror portion is reflected by a sub-mirror 202 provided on a back face side of the main mirror 201, and guided to a focus detection unit 207.

The focus detection unit 207 is configured with a second imaging optical system (a reimaging optical system) and a focus detection element, and luminous flux received by each line sensor on the focus detection element is photoelectrically converted to generate a pair of image signals. In a phase difference detection scheme, a defocus amount is detected based on a relative shift amount of the pair of image signals. Focus detection using the pair of image signals generated by the focus detection unit 207 is second imaging phase difference AF (autofocus).

On the other hand, luminous flux reflected by the main mirror 201 forms an image on a focus plate 203 disposed at a position optically conjugate with an image sensor 209. Light (object image) diffused by the focus plate 203 and transmitted through the focus plate 203 is converted into an erect image by a pentagonal roof prism 204. The erect image is enlarged by an eyepiece lens 205, and a user can observe this enlarged image. A transmissive liquid crystal 215 is disposed on the focus plate 203, and displays various information related to shooting such as a shutter speed, an aperture value, an ISO sensitivity, or a warning to the user. The display contents can be observed by the user together with the object image. A light source detection sensor 217 receives object light diffused by the focus plate 203 from an angle different than an angle observed by the user. The light source detection sensor 217 is composed of pixels having color filters of each color R, G, and B, and converts light received by the pixels having the respective filters of R, G, and B into electrical signals by photoelectric conversion. Based on this electrical signal, a camera control unit 211 calculates a color ratio CR in which the color of the object is converted to a numerical value, thereby determining the color and the light source of the object. When the color or the light source of the object changes, due to the influence of chromatic aberration of the imaging lens 100, the focus detection unit 207 detects an in-focus state as if focus has changed, so a focus detection error occurs. The color ratio CR is calculated using an expression such that the color ratio CR is proportional to the focus detection error of the focus detection unit 207 caused by the chromatic aberration of the imaging lens 100.

Also, when the main mirror 201 is set so the mirror is up in the second position, the sub-mirror 202 is also folded together with the main mirror 201 and withdrawn outside of the shooting optical path. Therefore, luminous flux that passed through the optical system of the imaging lens 100 passes through a focal plane shutter 209, which is a mechanical shutter, and reaches an image sensor 210. The focal plane shutter 209 limits the amount of light incident on the image sensor 210. The image sensor 210 is configured including image generation pixels and focus detection pixels, and photoelectrically converts the object image that was formed by the imaging lens 100. The image generation pixels output an electrical signal for photoelectrically converting the object image and generating a shot image. In the focus detection pixels, an opening portion of a wiring layer is biased in one direction with respect to a center line of a microlens. In the case of a configuration acquiring an image signal having parallax in the horizontal direction (left-right direction), focus detection pixels (for an A image) whose opening portion is biased to the left side and focus detection pixels (for a B image) whose opening portion is biased to the right side are provided. With such a configuration, a pair of image signals having parallax is generated. The image sensor 210 is configured using a photoelectric conversion element such as a CCD sensor or a CMOS sensor. Focus detection using the pair of image signals generated by the image sensor 210 is capturing plane phase difference AF (autofocus). Note that the configuration of the image sensor 210 capable of performing the capturing plane phase difference AF is not limited to a configuration in which focus detection pixels are provided as described above. For example, a configuration may also be adopted in which an image signal having a pair of parallaxes is acquired using a configuration in which, in each pixel, a plurality of photoelectric conversion units are provided corresponding to one microlens.

The camera control unit 211 is a controller that controls various computations and various operations in the image capturing apparatus 200, and has a function of automatically calculating and setting an AF correction value to be described later. The camera control unit 211 is configured using a CPU, an MPU, or the like, and controls the operation of each circuit or the like described later. The camera control unit 211 communicates with a lens control unit 103 in the imaging lens 100 through the electrical contact unit 104. The camera control unit 211 performs detection of a defocus amount based on a pair of image signals generated by the focus detection unit 207 and a pair of image signals generated by the image sensor 210. The lens control unit 103, according to a control signal from the camera control unit 211, controls a lens driving mechanism 102 that performs focus adjustment by driving the focus lens 101 in the optical axis direction. The lens driving mechanism 102 has a stepping motor as a drive source.

Also, an EEPROM 212 is connected to the camera control unit 211. The EEPROM 212 stores parameters required to be adjusted when controlling the image capturing apparatus 200, camera ID (identification) information for performing individual identification of the image capturing apparatus 200, factory adjustment values of parameters related to shooting that have been adjusted in advance using a reference lens, or the like. Also, the EEPROM 212 stores a temperature detected by a thermometer 208 to be described later, and a color ratio CR at the time of shooting detected by the light source detection sensor 217. Furthermore, a shooting time measured by a clock incorporated in the camera control unit 211, and a plurality of focus detection results of capturing plane phase difference AF and second imaging phase difference AF acquired across a plurality of past instances of shooting, also are stored.

Further, connected to the camera control unit 211 are the thermometer 208 capable of measuring the temperature at the time of focus detection, an operation detection unit 213 that detects operation to the image capturing apparatus 200 by a user, and an LED 216 capable of notifying the user of the state of the camera. The operation detection unit 213 detects an operation of an unshown release button, a selection button, or the like.

A display unit 214 is a display apparatus configured to display image data captured by the image sensor 210, and display an item set by the user, and is commonly configured using a color liquid crystal display element.

On the other hand, a memory that stores performance information such as a focal length and an open aperture value of the imaging lens 100, and lens ID (identification) information that is unique information for identifying the imaging lens 100, is built into the lens control unit 103 of the imaging lens 100. This memory also stores information received in communications from the camera control unit 211. Note that the performance information and the lens ID information of the imaging lens 100 are transmitted to the camera control unit 211 by initial communications at the time of attaching the imaging lens 100 to the image capturing apparatus 200, and the camera control unit 211 stores this information in the EEPROM 212.

FIGS. 2A and 2B are flowcharts showing processing from setting an AF correction value (adjustment value) to performing an AF accuracy check in the present embodiment. In AF micro-adjustment in the present embodiment, an AF correction value can be changed by two adjustment methods, specifically, a level input adjustment in which the user manually inputs an arbitrary AF correction value, and a learning adjustment in which the camera automatically calculates an AF correction value based on accumulated data. An AF accuracy check is a function to check focus detection accuracy of the second imaging phase difference AF after setting an AF correction value. Note that an AF correction value that has been registered by AF micro-adjustment is used for correction of the second imaging phase difference AF when performing actual shooting (shooting of an image for recording). That is, in order to perform correction using the AF correction value in actual shooting, it is necessary to register an AF correction value in advance using AF micro-adjustment.

First, in step S1, whether or not to decide an AF correction value with level input adjustment is selected. If the user selects level input adjustment, processing proceeds to step S2, and if learning adjustment is selected, processing proceeds to step S12.

Figure 3:
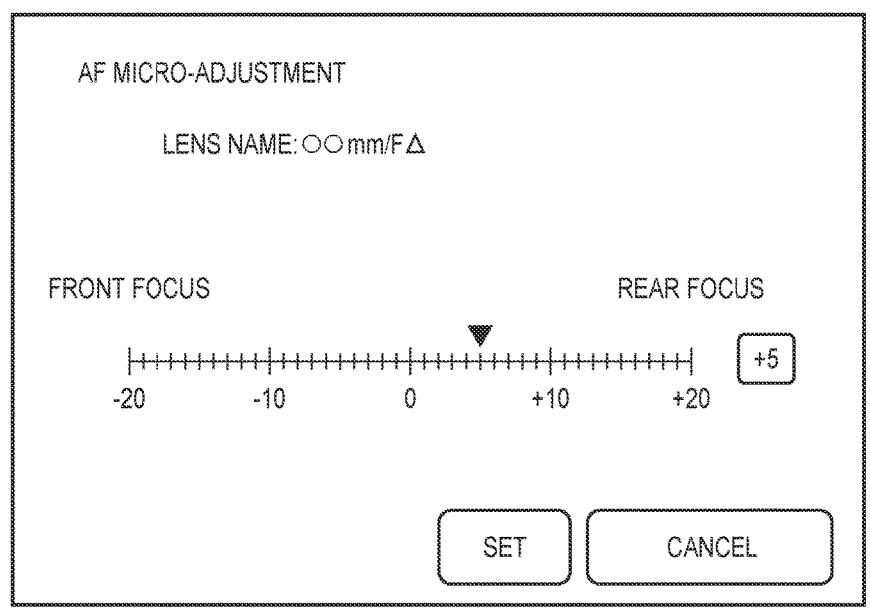
FIG. 3 shows an example of an AF correction value setting screen used in level input adjustment in one embodiment of the present invention.

In step S2, the camera control unit 211 performs control to display an AF correction value setting screen for performing level input adjustment on the display unit 214. FIG. 3 shows an example of the AF correction value setting screen. Level input adjustment is a function in which the user directly sets the AF correction value. The user, based on a shot image, judges a focus shift amount from an in-focus position based on results of focus detection by the focus detection unit 207 to a desired in-focus position, and the direction of the focus shift, and sets an AF correction value. As shown in FIG. 3, in the level input adjustment in the present embodiment, it is possible for the user to arbitrarily set the AF correction value in increments of one tick in a scale of ±20 ticks, and according to the AF correction value that has been set, the in-focus position is shifted based on the defocus amount. The focus change amount per one tick of the AF correction value is ($\frac{1}{16}$)× Fδ (F being the open F value of the imaging lens, and δ being an allowable circle of confusion diameter) in the present embodiment, but this is not a limitation, and the focus change amount per one tick of the AF correction value can be appropriately changed according to the performance of the imaging lens 100 or the image capturing apparatus 200.

In FIG. 3, "0" is a reference position that was set at the time of factory shipment of the image capturing apparatus 200. In the AF correction value setting screen shown in FIG. 3, the solid triangle display represents the AF correction value stored in the EEPROM 212. By the user performing operation to move the solid triangle display along the scale, the AF correction value can be changed. Note that in the present embodiment, the AF correction value is stored in increments of scale units such as +1, but the AF correction value may also be stored in units of defocus amount. When the AF correction value setting screen is displayed, processing proceeds to step S3.

In step S3, the camera control unit 211 determines whether or not an operation to change the AF correction value has been performed by the user using the AF correction value setting screen. If an operation to update the AF correction value has been performed, processing proceeds to step S4, and if an operation to update the AF correction value has not been performed, processing proceeds to step S5.

In step S4, the camera control unit 211 performs control to update the display of the AF correction value setting screen according to the operation of the user. Here, in the AF correction value setting screen shown in FIG. 3, the position of the solid triangle display is moved to the position corresponding to the operation of the user.

In step S5, the camera control unit 211 determines whether or not the user has decided the AF correction value. Here, in the AF correction value setting screen shown in FIG. 3, it is determined whether or not a "setting" button has been selected. If the "setting" button has not been selected, processing returns to step S3 and the above processing is repeated. On the other hand, if the "setting" button has been selected and the AF correction value is decided, processing proceeds to step S6, the camera control unit 211 ends the display of the AF correction value setting screen, and processing proceeds to step S7.

In step S7, the camera control unit 211 determines whether or not the AF correction value stored in the EEPROM 211 at the time the level input adjustment was selected differs from the AF correction value newly set by the processing in steps S3 to S5. If these values are different, that is, if the AF correction value has been updated, processing proceeds to step S8 and the camera control unit 211 updates the registration of the AF correction value stored in the EEPROM 212, and if the AF correction value has not been updated, the AF correction value setting processing is ended.

The AF correction value stored in the EEPROM 212 by the above processing is used for correction of a driving amount of the focus lens at the time of AF based on the results of focus detection by the focus detection unit 207 when performing normal shooting, according to the following Expression (1).

Focus shift amount used for calculation of lens driving amount=defocus amount+focus shift amount corresponding to AF correction value    (1)

Note that in the above Expression (1), the defocus amount represents the defocus amount (focus detection result) detected by the focus detection unit 207. The defocus amount may be calculated taking into consideration defocus amount adjustment data at the time of manufacture, and correction values that have been set in advance such as a temperature correction value that corrects the focus shift amount due to temperature, and a durability correction value that corrects focus which changes according to the number of times of shutter release.

When the registration of the AF correction value is updated in step S8, processing proceeds to step S9. In step S9, various data in the state using the AF correction value is accumulated in order to perform an accuracy check in step S11. The data to be accumulated includes focus detection results in the capturing plane phase difference AF, focus detection results in the second imaging phase difference AF, the temperature at the time of shooting, the light source at the time of shooting, the time of shooting, and the like. FIG. 4 shows a database accumulated in the present embodiment. As shown in FIG. 4, various data is accumulated for each image. Details of the data accumulation mode will be described later.

In step S10, it is confirmed whether or not at least a predetermined number of images (at least N images) have been shot in a state with the AF correction value updated. The number N of shot images is a number of shot images sufficient to perform a reliable accuracy check. If the number of shot images is at least N, processing proceeds to step S11, and if the number of shot images is less than N, processing returns to step S9, and data accumulation is continued.

In step S11, an accuracy check of focus detection of the second imaging phase difference AF is performed. Based on the data accumulated in steps S9 and S10, a check is performed of whether the defocus amount detected using the AF correction value whose registration was updated in step S8 falls within a desired error range. Details of the accuracy check will be described later. When the accuracy check ends, processing proceeds to step S20.

In step S20, it is confirmed whether or not an automatic AF correction value setting function is enabled. The automatic AF correction value setting function is a function of automatically calculating an AF correction value when determined that the error of the AF correction value is large, and newly registering the calculated AF correction value in the EEPROM 212 to update the AF correction value. Because the AF correction value is automatically updated, the user can select whether or not to enable the function. If the automatic AF correction value setting function is enabled, processing proceeds to step S21, and if the automatic AF correction value setting function is disabled, processing ends.

In step S21, automatic AF correction value setting is performed. Details of the automatic AF correction value setting will be described later.

On the other hand, if level input adjustment has not been selected in step S1, learning adjustment is performed from step S12 onward. The learning adjustment is an adjustment scheme in which the two types of focus detection results, namely the focus detection results of the capturing plane phase difference AF and the focus detection results of the second imaging phase difference AF, in one instance of shooting are accumulated in a database and an AF correction value is calculated based on the accumulated data. The focus detection by the second imaging phase difference AF is performed by the focus detection unit 207. The focus detection accuracy of the second imaging phase difference AF may decrease due to dimensional changes due to temperature changes of components of the focus detection unit 207 or deterioration with age. On the other hand, regarding the accuracy of the capturing plane phase difference AF, because the image sensor 209 is used in the capturing plane phase difference AF, the error factor is small compared to second imaging phase difference AF, and stable results with high accuracy are easily obtained. Therefore, the AF correction value is calculated based on the focus detection results of the capturing plane phase difference AF. The AF correction value calculated by the learning adjustment may be expressed in a unit of mm indicating the defocus amount, or may be expressed in a unit of a scale similar to the level input adjustment.

In step S12, as in step S9, data necessary in order to calculate the AF correction value is accumulated. Details of the data accumulation mode will be described later. In step S13, the number of images shot in the data accumulation mode is confirmed. If there is data of at least a predetermined number of shot images (at least M images) necessary in order to calculate a reliable AF correction value, processing proceeds to step S14, and if the amount of data is less than data of M images, data accumulation is continued.

Figure 5:
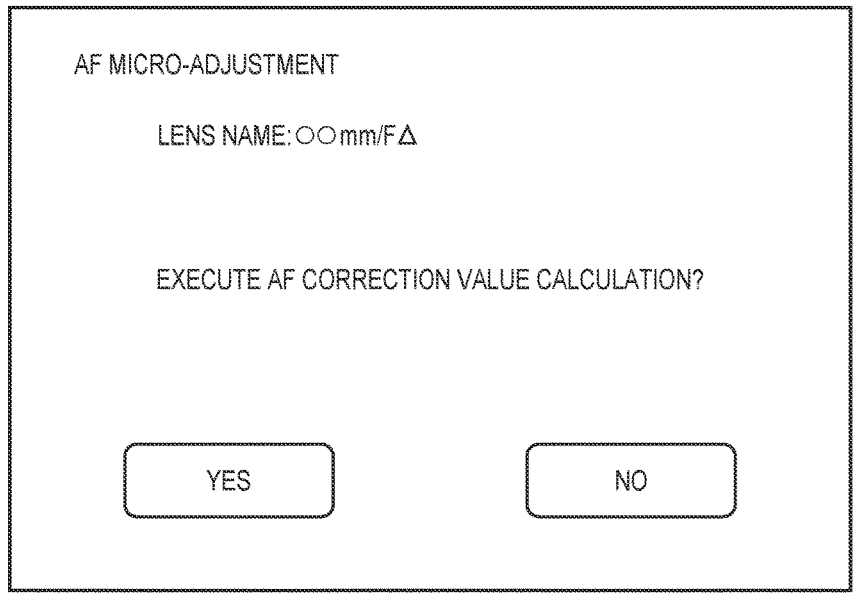
FIG. 5 shows an example of an AF correction value calculation execution screen used in learning adjustment in one embodiment of the present invention.

In step S14, the camera control unit 211 performs control to display an AF correction value calculation execution screen in the learning adjustment in the display unit 214. FIG. 5 shows an example of the AF correction value calculation execution screen. When display of the AF correction value calculation execution screen is completed, processing proceeds to step S15.

In step S15, the user confirms an AF correction value calculation execution instruction to the image capturing apparatus 200. The AF correction value calculation execution instruction is performed through the operation detection unit 213. If there is an instruction to execute calculation, processing proceeds to step S16, and if there is not an instruction to execute calculation, processing returns to step S1.

Figure 6:
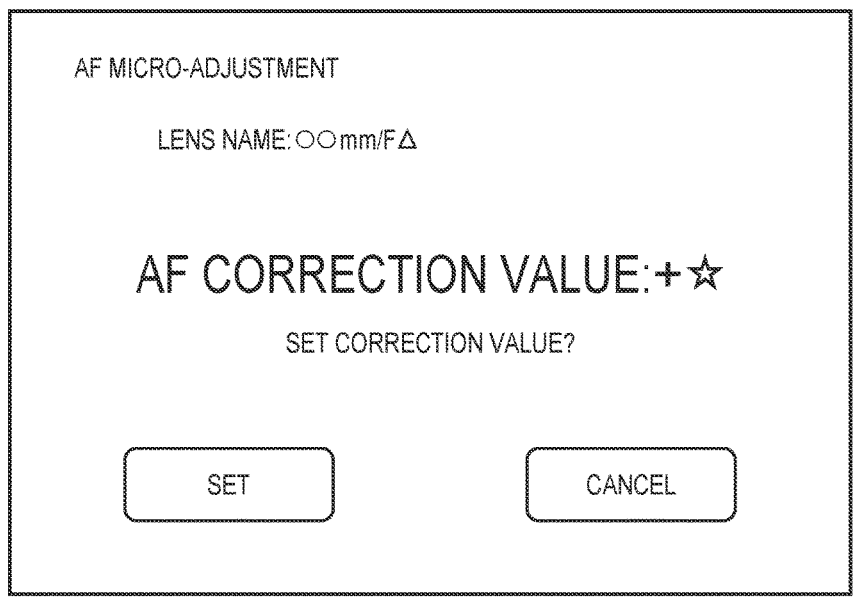
FIG. 6 shows an example of an AF correction value calculation result display screen in one embodiment of the present invention.

In step S16, an AF correction value is calculated. The focus detection results vary due to object contrast, brightness, stopping accuracy of the focus lens 101, and the like. Therefore, calculation of the AF correction value is performed by averaging a plurality of items of data accumulated in the database at the time of instructing execution of calculation of the AF correction value. The AF correction value is calculated from the difference between an average value of the focus detection results of the second imaging phase difference AF and an average value of the focus detection results of the capturing plane phase difference AF. At this time, the AF correction value may be calculated by averaging all the data accumulated in the database, or the AF correction value may be calculated by averaging the data of a predetermined number of most recently shot images. In FIG. 4, image data of four images is used to calculate the AF correction value. When calculation of the AF correction value is completed, processing proceeds to step S17. In step S17, the calculated AF correction value is displayed in the display unit 214. FIG. 6 shows an example of an AF correction value calculation result display screen. When display is completed, processing proceeds to step S18.

In step S18, the camera control unit 211 determines whether or not the user has decided the AF correction value. Here, in an AF correction value calculation result display screen shown in FIG. 6, when a "set" button is selected and the AF correction value is decided, processing proceeds to step S19. In step S19, the camera control unit 211 ends display of the AF correction value calculation result display screen and proceeds to step S7. On the other hand, if a "cancel" button is selected in the AF correction value calculation result display screen, this flow ends.

Figure 7:
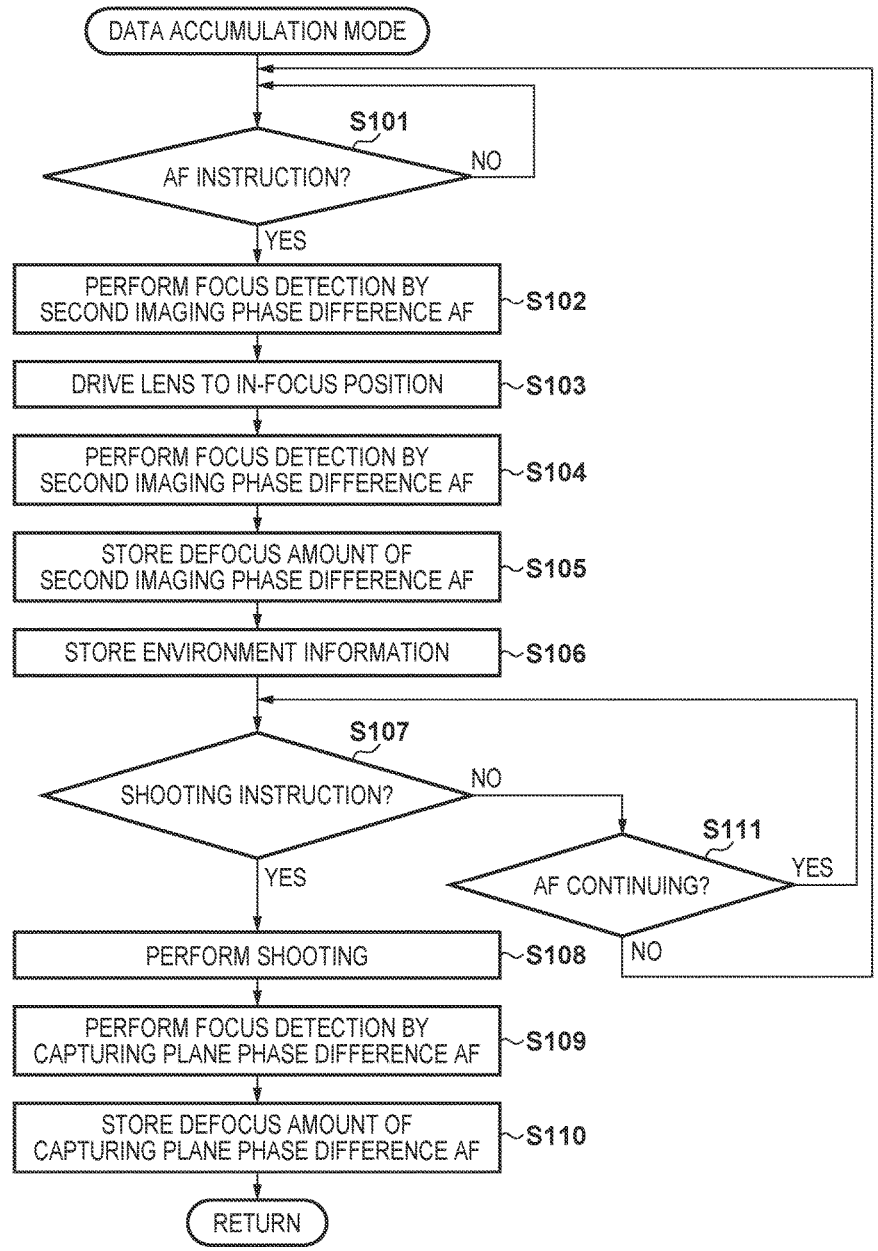
FIG. 7 is a flowchart showing processing of a data accumulation mode in one embodiment of the present invention.

FIG. 7 is a flowchart showing processing of the data accumulation mode in the present embodiment. When processing proceeds to step S9 or step S12 in FIG. 2B, processing moves to step S101 in FIG. 7. In step S101, it is confirmed whether or not the user instructed the image capturing apparatus 200 to perform AF. An AF instruction is generated by pressing an unshown release button halfway. Alternatively, an AF instruction may be given through an unshown AF instruction button. If the user has given an AF instruction, processing proceeds to step S102.

In step S102, focus detection by the second imaging phase difference AF is performed according to the AF instruction, and the defocus amount of the imaging lens 100 is detected. In step S103, the focus lens 101 is driven to the in-focus position according to the defocus amount detected in step S102. After driving the focus lens 101 to the in-focus position, in step S104, focus detection by the second imaging phase difference AF is performed again, and in step S105 the defocus amount at that time is stored in the EEPROM 212. In an ideal state, the defocus amount to be stored in step S105 is expected to be 0, but due to variations in focus detection, drive error of the imaging lens 100, and the like the defocus amount is not necessarily 0. When storing of the defocus amount is completed, processing proceeds to step S106.

In step S106, the temperature at the time of shooting detected by the thermometer 208, the color ratio CR at the time of shooting detected by the light source detection sensor 217, and the shooting time measured by the clock in the camera control unit 211 are stored as environment information of the surroundings of the image capturing apparatus in the EEPROM 212 (environment information detection). When storing of the environment information is completed, processing proceeds to step S107.

In step S107, it is confirmed whether or not the user instructed the image capturing apparatus 200 to perform shooting. A shooting instruction is generated by fully pressing an unshown release button. If the user has instructed shooting in step S107, processing proceeds to step S108 and shooting is performed. If the user has not instructed shooting, processing proceeds to step S111.

In step S108, shooting is performed by exposing the object image that was formed by the imaging lens 100 to the image sensor 210 for a predetermined time. The camera control unit 211 generates an image signal based on the electrical signal generated by the image generation pixels disposed in the image sensor 210. In step S109, focus detection (capturing plane phase difference AF) is performed based on a pair of image signals generated by the focus detection pixels disposed in the image sensor 210. In step S110, the defocus amount based on the pair of image signals generated by the image sensor 210 is stored in the EEPROM 212.

In steps S102 to S110, at the position of the focus lens 101 driven based on the focus detection results of the second imaging phase difference AF, focus detection results by two different techniques are stored in the EEPROM 212. As described above, because focus detection can be performed with higher accuracy in the capturing plane phase difference AF than the second imaging phase difference AF, the difference between the two different defocus amounts stored in step S105 and step S110 represents the focus detection error in the second imaging phase difference AF. When storing of the defocus amount in step S110 is completed, the data accumulation mode ends.

In step S111, it is confirmed whether or not the AF instruction is being continued. If the AF instruction is being continued, processing returns to step S107. If the AF instruction is not being continued, processing returns to step S101.

Figure 8:
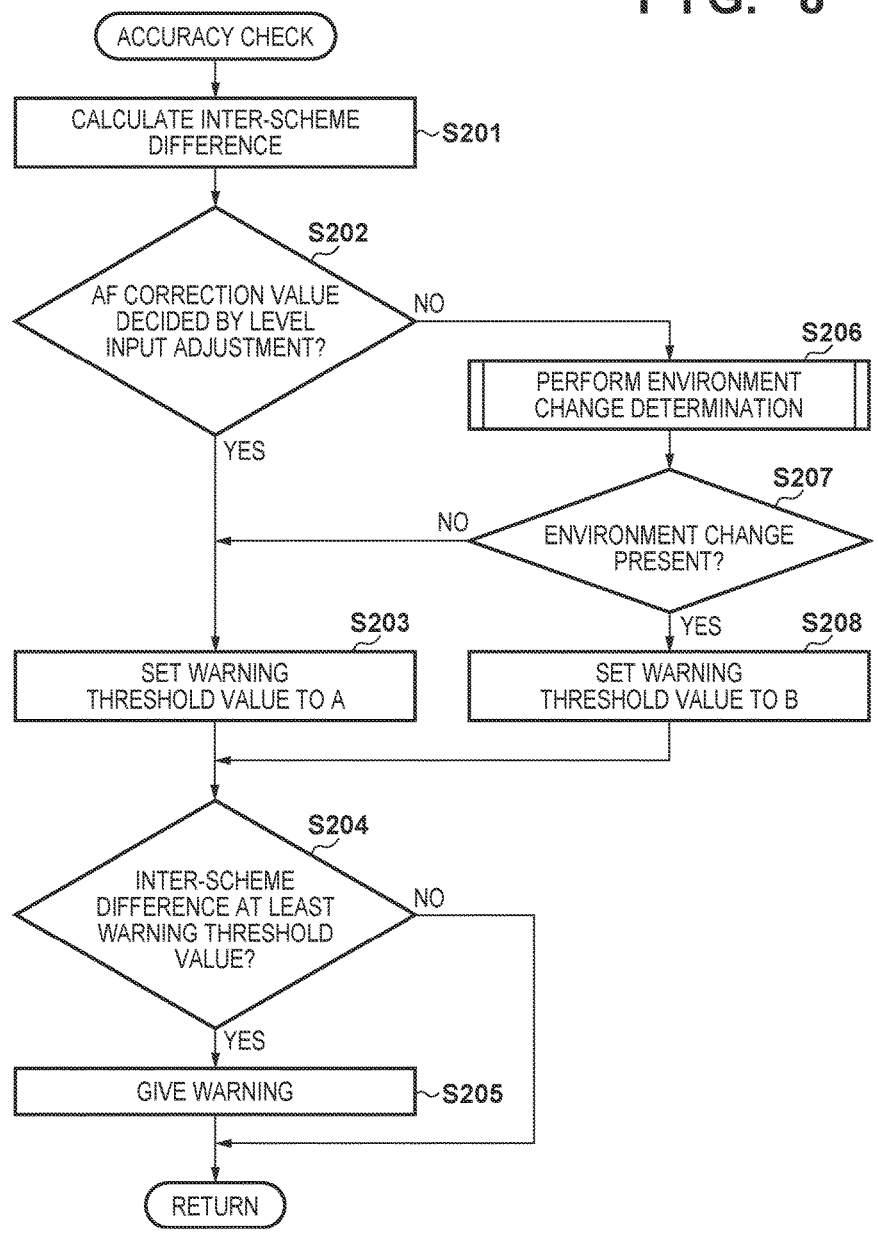
FIG. 8 is a flowchart showing processing of an accuracy check in one embodiment of the present invention.

FIG. 8 is a flowchart showing processing of the accuracy check of the AF correction value in the present embodiment.

In the accuracy check, the validity of the AF correction value is confirmed by calculating the focus detection error of the second imaging phase difference AF after the AF correction value is updated. If it is determined that the focus detection error of the second imaging phase difference AF is large (the error of the AF correction value is large), a warning is given to the user.

When processing proceeds to step S11 in FIG. 2A, the processing in step S201 in FIG. 8 is started. In step S201, in order to calculate the focus detection error of the second imaging phase difference AF, the difference (referred to below as an inter-scheme difference) between the detection values of the two types of AF schemes, which are the second imaging phase difference AF and capturing plane difference AF, is calculated. The term "inter-scheme difference" refers to the difference between the defocus amount of the second imaging phase difference AF stored in step S105 in FIG. 7, and the defocus amount of the capturing plane phase difference AF stored in step S110. The inter-scheme difference is calculated from the difference between an average value of the defocus amounts of the second imaging phase difference AF, and an average value of the defocus amounts of the capturing plane difference AF, of N images that were accumulated in steps S9 and S10 in FIG. 2A. The inter-scheme difference decreases if a correction remainder due to introduction of the AF correction value whose registration was updated in step S8 in FIG. 2A is small, and conversely the inter-scheme difference increases if the correction remainder is large. The inter-scheme difference may be calculated by a different method than calculating an average value of the defocus amounts of all of N images, such as calculating an average value excluding abnormal values among N images. When calculation of the inter-scheme difference is completed, processing proceeds to step S202.

In step S202, it is discriminated whether or not the AF correction value whose registration was updated in step S8 was decided by level input adjustment. When discriminated that the AF correction value was decided with learning adjustment, in steps S12 and S13 in FIG. 2B, the camera already possesses the environment information before registration of the AF correction value is updated in step S8, so it is possible to determine whether or not an environment change has occurred between before and after updating the registration of the AF correction value. Therefore, when discriminated that the AF correction value was decided with learning adjustment, processing proceeds to an environment change determination in step S206. When discriminated that the AF correction value was decided with level input adjustment, processing proceeds to step S203.

In step S203, a warning threshold value is set to A (threshold value setting). The warning threshold value may be given in mm units, which are defocus units, or may be given in AF correction value units. When setting of the warning threshold value is completed, processing proceeds to step S204.

In step S204, it is determined whether or not the inter-scheme difference calculated in step S201 matches a warning condition. Because the inter-scheme difference can have either a positive or negative value, the inter-scheme difference is determined to match the warning condition if Expression (2) or (3) below is satisfied.

$$A < \text{inter-scheme difference} \tag{2}$$

$$-A > \text{inter-scheme difference} \tag{3}$$

When the inter-scheme difference matches the warning condition, it can be determined that the AF correction value is wrong, so a warning is given in step S205. When the inter-scheme difference does not match the warning condition, it can be determined that an appropriate AF correction value is stored, so processing ends without giving a warning. In step S205, a warning mark is displayed on the transmissive liquid crystal 215, or the LED 216 is lighted or flashed to notify the user that the error of the AF correction value is large. When the warning is completed, processing ends.

Next is a description of operation in steps S206 to S208. Since the focus detection results in the second imaging phase difference AF vary depending on the environment (the temperature or the light source) at the time of shooting, the optimal AF correction value depends on the environment. When the temperature changes, a focus detection error occurs due to thermal expansion because of the distance from the image sensor 210 to an unshown mount portion, and due to thermal expansion of the second imaging optical system inside the focus detection unit 207. Also, when the light source changes, due to the influence of chromatic aberration of the imaging lens, the focus detection unit 207 performs detection as if the in-focus state has changed, so a focus detection error occurs. For these reasons, if an environment change has occurred between before and after updating the registration of the AF correction value, there is an increased possibility that the AF correction value will have a large error value. Therefore, the warning threshold value is set to a small value (a warning threshold value B) so that a warning is more easily given. On the other hand, if an environment change does not occur between before and after updating the registration of the AF correction value, there is a high probability that the AF correction value is correct, so the warning threshold value is set to a large value (the warning threshold value A) so that a warning is less likely to be given. In steps S206 to S208, this sort of operation is performed.

More specifically, in step S206, determination of an environment change is performed. Details of the method of determining an environment change will be described later. When the environment change determination is completed, processing proceeds to step S207, and presence or absence of an environment change is confirmed. When an environment change has occurred between before and after updating the registration of the AF correction value, processing proceeds to step S208, and when an environment change has not occurred, processing proceeds to step S203.

In step S208, the warning threshold value is set to B. When an environment change has occurred between before and after updating the registration of the AF correction value, there is an increased possibility that the AF correction value will have a large error for the reasons described above, so the warning threshold value B is set to a value smaller than the above-described warning threshold value A so that a warning is more easily given. When setting of the warning threshold value is completed, processing proceeds to step S204. Operation from step S204 onward is as already described above.

Figure 9:
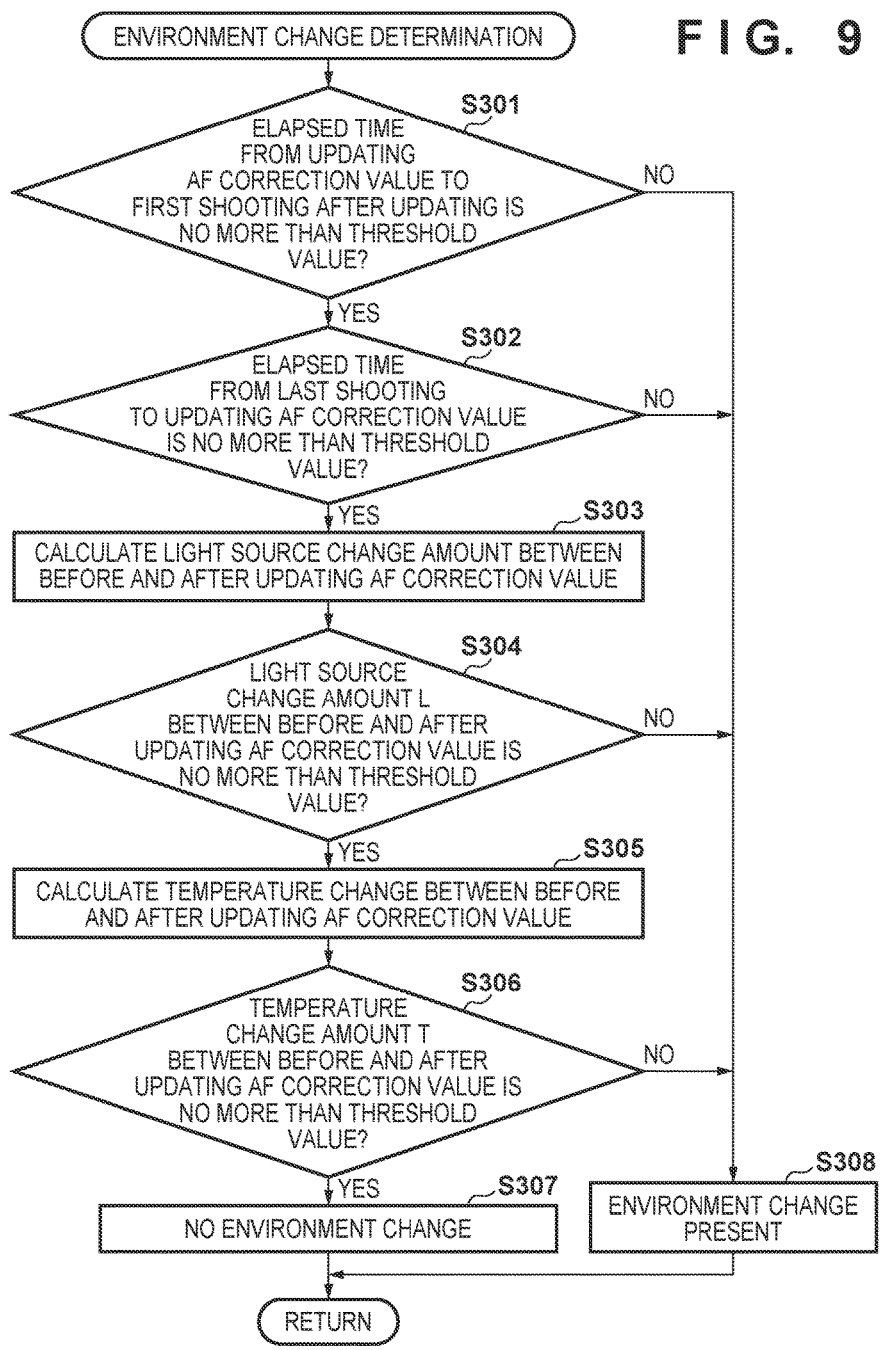
FIG. 9 is a flowchart showing determination processing of determining an environment change in one embodiment of the present invention.

Next, FIG. 9 is a flowchart showing the environment change determination processing in the present embodiment. The presence or absence of an environment change are determined from the viewpoints of elapsed time from shooting to updating the registration of the AF correction value, elapsed time from updating the registration of the AF correction value to shooting, change in light source, and change in temperature.

When processing proceeds to step S206 in FIG. 8, the processing in step S301 is started. In step S301, it is determined whether or not the elapsed time from updating the registration of the AF correction value to the first shooting after updating the registration is no more than the threshold value. If the threshold value is exceeded, it can be judged that there is a possibility that an environment change (for example, such as a humidity change) affecting the AF correction value and that the camera cannot detect has occurred, so processing proceeds to step S308 and it is determined that there is an environment change. If the elapsed time from updating the registration of the AF correction value to the first shooting after updating the registration is no more than the threshold value, processing proceeds to step S302.

In step S302, it is determined whether or not the elapsed time from the last shooting to updating the registration of the AF correction value is no more than a threshold value. If the threshold value is exceeded, as in step S301, it can be judged that there is a possibility that an environment change affecting the AF correction value and that the camera cannot detect has occurred, so processing proceeds to step S308 and it is determined that there is an environment change. If the elapsed time from the last shooting to updating the registration of the AF correction value is no more than the threshold value, processing proceeds to step S303.

In step S303, a light source change amount L between before and after updating the registration of the AF correction value is calculated. Regarding the light source change amount L, a light source change amount L between before and after updating the registration of the AF correction value is calculated from the difference between the average value of the color ratio CR before updating the registration of the AF correction value accumulated in step S12 and step S13 in FIG. 2B, and the average value of the color ratio CR after updating the registration of the AF correction value accumulated in step S9 and step S10 in FIG. 2A. When calculation of the light source change amount L is completed, processing proceeds to step S304.

In step S304, it is determined whether or not the light source change amount L between before and after updating the registration of the AF correction value is no more than a threshold value. If the light source change amount L is no more than the threshold value, processing proceeds to step S305. If the light source change amount L is greater than the threshold value, processing proceeds to step S308, where it is determined that there is an environment change.

In step S305, a temperature change amount T between before and after updating the registration of the AF correction value is calculated. The temperature change amount T between before and after updating the registration of the AF correction value is calculated from the difference between the average value of the temperature data before updating the registration of the AF correction value accumulated in step S12 and step S13 in FIG. 2B, and the average value of the temperature data after updating the registration of the AF correction value accumulated in step S9 and step S10 in FIG. 2A. When calculation of the temperature change amount T is completed, processing proceeds to step S306.

In step S306, it is determined whether or not the temperature change amount T between before and after updating the registration of the AF correction value is no more than a threshold value. If the temperature change amount T is no more than the threshold value, processing proceeds to step S307, where it is determined that there is not an environment change between before and after updating the registration of the AF correction value. If the temperature change amount T is greater than the threshold value, processing proceeds to step S308, where it is determined that there is an environment change. When the environment change determination finishes, the environment change determination ends.

Incidentally, as a use example of the level input adjustment, it is assumed that the focus position of the image is intentionally shifted to front focus or rear focus according to the preference of the user. In this case, there is a concern that the camera will give a warning due to the accuracy check in step S11 in FIG. 2A despite the fact that the user has shifted the focus position according to their preference. Therefore, a configuration may also be adopted in which the user can arbitrarily change the warning condition for determining the necessity of giving a warning in step S204 in FIG. 8.

Figure 10:
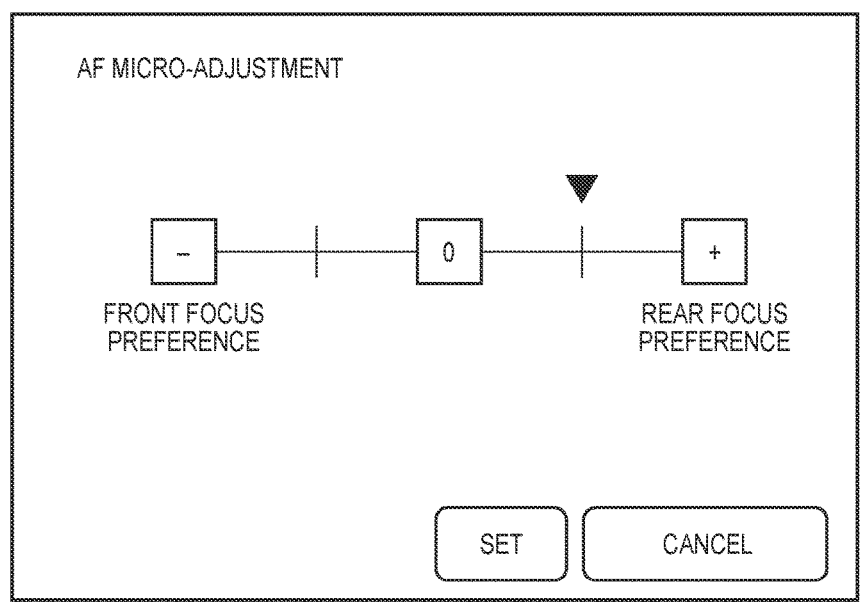
FIG. 10 shows an example of a warning condition change screen in one embodiment of the present invention.

FIG. 10 shows an example of a warning condition change screen in the present embodiment. The warning condition can be changed by changing the scale shown in FIG. 10 to a front focus preference or a rear focus preference. The warning condition change amount per one tick shown in FIG. 10 is $(1/4) \times F\delta$ (F being the open F value of the imaging lens, and $\delta$ being an allowable circle of confusion diameter) in the present embodiment, but this is not a limitation, and the warning condition change amount per one tick can be appropriately changed according to the performance of the imaging lens 100 or the image capturing apparatus 200. In FIG. 10, a shift of one tick in the rear focus direction has been input, so when the following Expression (4) or (5) is satisfied, it is determined that the warning condition is satisfied in step S204.

$$-(1/4) \times F\delta + A < \text{inter-scheme difference} \quad (4)$$

$$-(1/4) \times F\delta - A > \text{inter-scheme difference} \quad (5)$$

Figure 11:
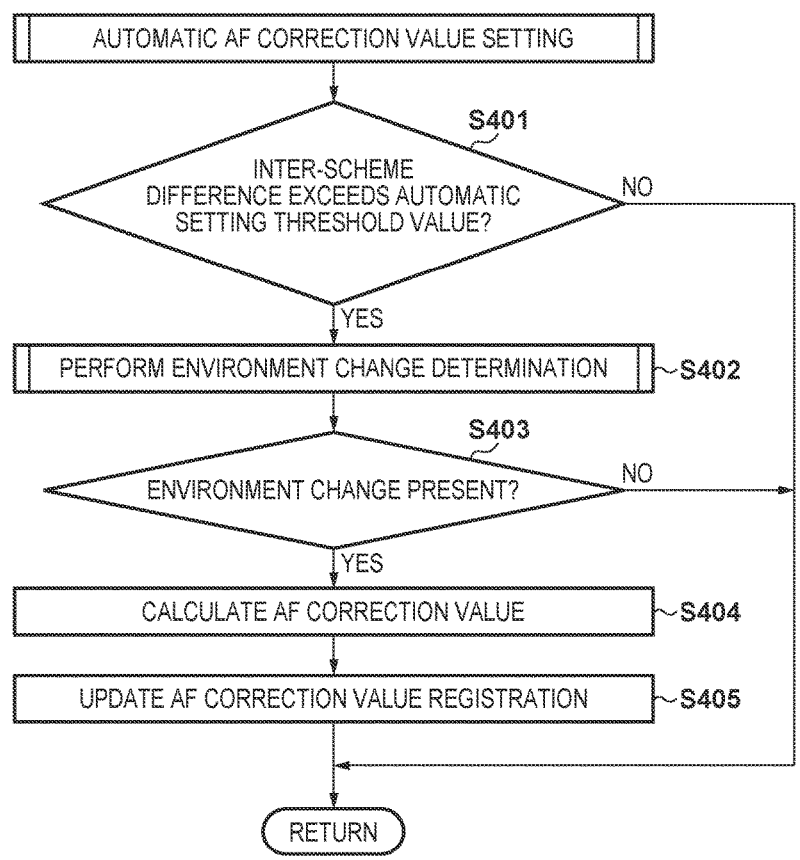
FIG. 11 is a flowchart showing AF correction value setting processing in one embodiment of the present invention.

Next, FIG. 11 is a flowchart showing automatic AF correction value setting processing in the present embodiment. When processing proceeds to step S21 in FIG. 2B, processing shifts to an automatic AF correction value setting mode, and the processing of step S401 is started.

In step S401, it is determined whether or not the inter-scheme difference, which is the difference between the focus detection results in the capturing plane phase difference AF and the focus detection results in the second imaging phase difference AF, exceeds an automatic setting threshold value S. The automatic setting threshold value S is a threshold value that determines whether or not to automatically change the AF correction value. Also, the automatic setting threshold value S is a unique value stored in the EEPROM 212 at the time of factory shipment of the image capturing apparatus 200, but it is also possible to change the setting of the automatic setting threshold value S by operation of an unshown selection button in accordance with the preference of the user. For example, here the value of automatic setting threshold value S is set to 20.0 μm. When the inter-scheme difference, which is the difference between the focus detection results in the capturing plane phase difference AF and the focus detection results in the second imaging phase difference AF, exceeds the automatic setting threshold value S, processing proceeds to step S402. When the inter-scheme difference does not exceed the automatic setting threshold value S, the AF correction value is not updated.

In step S402, the environment change determination is performed. An environment change may be determined by a similar procedure as in the previously described flowchart in FIG. 9. However, note that the method of determining an environment change is not limited to the method shown in FIG. 9, and an environment change may also be determined by another method employing environment measurement results. When the environment change determination is completed, processing proceeds to step S403, where it is confirmed whether or not there is an environment change. When there has been an environment change between before and after updating the registration of the AF correction value, processing proceeds to step S404, and when there has not been an environment change, this routine is ended without updating the AF correction value. Note that the reason for updating the AF correction value when the environment has changed is that a large variation in focus detection due to contrast or brightness of the object occurs when the environment has changed.

In step S404, an AF correction value is calculated. Because focus detection results vary due to contrast or brightness of the object, or the stopping accuracy of the focus lens 101 or the like, in the calculation of the AF correction value, the difference between the focus detection results in the capturing plane phase difference AF and the focus detection results in the second imaging phase difference AF is accumulated, and this accumulated data is averaged. At this time, the AF correction value is calculated from the focus detection results in the capturing plane phase difference AF and the focus detection results in the second imaging phase difference AF that were stored after updating the AF correction value. That is, the AF correction value is calculated using only the focus detection results stored from step S9 onward in FIG. 2A. The reason for calculating the AF correction value with the data from step S9 onward is that the appropriate AF correction value changes depending on the environment. However, this is only an example, and the calculation of the AF correction value may also include, for example, focus detection results of a plurality of instances of capturing plane phase difference AF and a plurality of instances of second imaging phase difference AF that were stored before step S9. Furthermore, the AF correction value may be calculated by averaging focus detection results after removing abnormal values from among a plurality of focus detection results in the capturing plane phase difference AF and a plurality of focus detection results in the second imaging phase difference AF. When calculation of the AF correction value in step S404 finishes, processing proceeds to step S405.

In step S405, the registration of the AF correction value is updated. That is, the camera control unit 211 updates the registration of the AF correction value stored in the EEPROM 212, and then the AF correction value setting mode ends.

As described above, in the present embodiment, based on the inter-scheme difference after updating the registration of the AF correction value, it is determined whether or not the AF correction value is an appropriate value, and when determined that the AF correction value is wrong, a warning can be given to the user. Also, the user can select whether to manually update the AF correction value or to automatically update the AF correction value. By adopting such a configuration, it is possible to prevent a decrease in focus detection accuracy due to the user continuing to use an AF correction value that has a large error.

Although preferred embodiments of the present invention have been described above, the present invention is not limited to these embodiments, and various modifications and changes are possible within the scope of the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-116455, filed Jun. 10, 2016, which is hereby incorporated by reference herein in its entirety.

What is claimed is:

1. An image capturing apparatus, comprising:
    an image sensor configured to capture an object image that was formed by an imaging lens;
    a memory configured to store an AF correction value that was set by a setting unit, and
    at least one processor or circuit programmed to function as:
    a first focus detection unit configured to perform focus detection based on a pair of image signals generated by the image sensor;
    a second focus detection unit configured to image the object image on a focus detection element as a pair of images by a second imaging optical system, and perform focus detection based on a pair of image signals generated by the focus detection element;
    the setting unit configured to set an AF correction value used in correction of a focus detection result by the second focus detection unit; and
    a determining unit configured to determine accuracy of the AF correction value that has been stored in the memory, based on a focus detection result by the first focus detection unit, a focus detection result by the second focus detection unit and the AF correction value that has been stored in the memory.

2. The image capturing apparatus according to claim 1, wherein the determining unit outputs a warning when a difference between a focus detection result in the first focus detection and a focus detection result in the second focus detection exceeds a warning threshold value.

3. The image capturing apparatus according to claim 2, wherein the at least one processor or circuit further function as:

an environment information detection unit configured to detect a change in the surrounding environment of the image capturing apparatus between before and after setting the AF correction value; and
    a threshold value setting unit configured to set the warning threshold value based on a detection result by the environment information detection unit.

4. The image capturing apparatus according to claim 3, wherein the environment information detection unit detects elapsed time from shooting to setting of the AF correction value.

5. The image capturing apparatus according to claim 3, wherein the environment information detection unit detects elapsed time from setting of the AF correction value to shooting.

6. The image capturing apparatus according to claim 3, wherein the environment information detection unit detects a light source change amount between before and after setting of the AF correction value.

7. The image capturing apparatus according to claim 3, wherein the environment information detection unit detects a temperature change amount between before and after setting of the AF correction value.

8. The image capturing apparatus according to claim 2, wherein the setting unit has an input unit where a user inputs the AF correction value.

9. The image capturing apparatus according to claim 1, wherein the setting unit has a calculation unit configured to calculate the AF correction value based on the difference.

10. The image capturing apparatus according to claim 9, wherein the calculation unit calculates the AF correction value based on the difference detected after setting of the AF correction value.

11. The image capturing apparatus according to claim 9, wherein the calculation unit determines whether or not to calculate the AF correction value based on a change in the surrounding environment of the image capturing apparatus between before and after setting of the AF correction value, and the size of the difference.

12. The image capturing apparatus according to claim 1, wherein the difference is calculated based on a plurality of focus detection results by the first focus detection unit and a plurality of focus detection results by the second focus detection unit.

13. The image capturing apparatus according to claim 1, wherein the first focus detection unit obtains a first defocus amount as the focus detection result and the second focus detection unit obtains a second defocus amount as the focus detection result.

14. The image capturing apparatus according to claim 1, wherein the AF correction value stored in the memory is able to be updated by the AF correction value set by the setting unit.

15. The image capturing apparatus according to claim 1, wherein the determining unit determines accuracy of the AF correction value that has been stored in the memory based on a difference between the focus detection result by the first focus detection unit and a corrected focus detection result which obtained by correcting the: focus detection result by the second focus detection unit with the AF correction value.

16. The image capturing apparatus according to claim 13, wherein the determining unit determines accuracy of the AF correction value that has been stored in the memory based on a difference between the first defocus amount and a corrected defocus amount which is obtained by correcting the second defocus amount with the AF correction value.

17. A control method of an image capturing apparatus having an image sensor configured to capture an object image that was formed by an imaging lens, the method comprising:
- storing an AF correction value in a memory;
- first focus detection of performing focus detection based on a pair of image signals generated by the image sensor;
- second focus detection of imaging the object image on a focus detection element as a pair of images by a second imaging optical system, and performing focus detection based on a pair of image signals generated by the focus detection element;
- setting an AF correction value used in correction of a focus detection result in the second focus detection; and
- determining accuracy of the AF correction value that has been stored in the memory, based on a focus detection result in the first focus detection, a focus detection result in the second focus detection and the AF correction value that has been stored in the memory.

18. A non-transitory computer-readable storage medium storing a program for causing a computer to execute a control method of an image capturing apparatus having an image sensor configured to capture object image that was formed by an imaging lens, the control method comprising:
- storing an AF correction value in a memory;
- first focus detection of performing focus detection based on a pair of image signals generated by the image sensor;
- second focus detection of imaging the object image on a focus detection element as a pair of images by a second imaging optical system, and performing focus detection based on a pair of image signals generated by the focus detection element;
- setting an AF correction value used in correction of a focus detection result in the second focus detection; and
- determining accuracy of the AF correction value that has been stored in the memory, based on a focus detection result in the first focus detection, a focus detection result in the second focus detection and the AF correction value that has been stored in the memory.

* * * * *